United States Patent
Wessler et al.

(10) Patent No.: US 10,577,124 B2
(45) Date of Patent: Mar. 3, 2020

(54) METHOD FOR DESTINATION APPROACH CONTROL OF UNMANNED AERIAL VEHICLES

(71) Applicants: Olaf Wessler, Koblenz (DE); Dania Lieselotte Reuter, Vallendar (DE)

(72) Inventors: Olaf Wessler, Koblenz (DE); Dania Lieselotte Reuter, Vallendar (DE)

(73) Assignee: Olaf Wessler, Koblenz (DE)

( * ) Notice: Subject to any disclaimer, the term of this patent is extended or adjusted under 35 U.S.C. 154(b) by 0 days.

(21) Appl. No.: 15/236,580

(22) Filed: Aug. 15, 2016

(65) Prior Publication Data

US 2017/0050747 A1    Feb. 23, 2017

(30) Foreign Application Priority Data

Aug. 22, 2015  (DE) .................... 10 2015 011 033
Oct. 10, 2015  (DE) .................... 10 2015 013 104

(51) Int. Cl.

| | |
|---|---|
| *B64D 45/08* | (2006.01) |
| *G05D 1/10* | (2006.01) |
| *G05D 1/00* | (2006.01) |
| *B64D 47/08* | (2006.01) |
| *B64C 39/02* | (2006.01) |
| *B64D 47/06* | (2006.01) |

(52) U.S. Cl.
CPC ............ *B64D 45/08* (2013.01); *B64C 39/024* (2013.01); *B64D 47/06* (2013.01); *B64D 47/08* (2013.01); *G05D 1/005* (2013.01); *G05D 1/101* (2013.01); *B64C 2201/128* (2013.01)

(58) Field of Classification Search
CPC ........ B64D 45/08; B64D 47/06; B64D 47/08; B64C 39/024; B64C 2201/128; B64C 2201/146; B64C 2201/18; G05D 1/005; G05D 1/101

See application file for complete search history.

(56) References Cited

U.S. PATENT DOCUMENTS

| | | | |
|---|---|---|---|
| 7,873,444 B1* | 1/2011 | Ehrmantraut | B64C 39/024 244/17.13 |
| 9,244,147 B1* | 1/2016 | Soundararajan | G01S 1/44 |
| 9,321,531 B1* | 4/2016 | Takayama | B64D 1/12 |
| 9,387,928 B1* | 7/2016 | Gentry | B64C 39/024 |
| 9,448,562 B1* | 9/2016 | Sirang | G05D 1/0676 |
| 9,513,635 B1* | 12/2016 | Bethke | G01C 21/20 |
| 9,849,981 B1* | 12/2017 | Burgess | B64D 1/12 |
| 2009/0162071 A1* | 6/2009 | Refai | H04B 10/1127 398/131 |
| 2011/0311099 A1* | 12/2011 | Derbanne | G06T 7/207 382/103 |
| 2013/0076862 A1* | 3/2013 | Ohtomo | G01C 11/025 348/46 |
| 2014/0210663 A1* | 7/2014 | Metzler | G01C 15/00 342/357.34 |
| 2014/0236388 A1* | 8/2014 | Wong | B64C 39/024 701/2 |

(Continued)

FOREIGN PATENT DOCUMENTS

CN          104015931 B  *  4/2015

*Primary Examiner* — Tuan C To

(57) ABSTRACT

The invention relates to a method for destination approach control of unmanned aerial vehicles, in particular delivery drones, to an arbitrary location defined by the recipient.

10 Claims, 2 Drawing Sheets

(56) References Cited

U.S. PATENT DOCUMENTS

| | | | |
|---|---|---|---|
| 2014/0254896 A1* | 9/2014 | Zhou | B25J 9/0006 |
| | | | 382/124 |
| 2015/0175276 A1* | 6/2015 | Koster | B64F 1/32 |
| | | | 244/114 R |
| 2015/0236778 A1* | 8/2015 | Jalali | H04W 84/06 |
| | | | 370/316 |
| 2015/0298822 A1* | 10/2015 | Eline | B64C 39/024 |
| | | | 244/75.1 |
| 2015/0317597 A1* | 11/2015 | Shucker | G06Q 10/083 |
| | | | 235/375 |
| 2016/0047890 A1* | 2/2016 | Ryan | G01S 5/16 |
| | | | 398/118 |
| 2016/0068264 A1* | 3/2016 | Ganesh | G08G 5/0069 |
| | | | 701/2 |
| 2016/0068265 A1* | 3/2016 | Hoareau | G05D 1/102 |
| | | | 701/3 |
| 2016/0150192 A1* | 5/2016 | Cheatham, III | G06K 9/00 |
| | | | 348/143 |
| 2016/0306355 A1* | 10/2016 | Gordon | G08G 5/0069 |
| 2016/0376031 A1* | 12/2016 | Michalski | B64F 1/36 |
| | | | 701/15 |
| 2017/0011333 A1* | 1/2017 | Greiner | G06Q 10/083 |
| 2018/0330323 A1* | 11/2018 | Trew | G06Q 10/0836 |

\* cited by examiner

METHOD FOR DESTINATION APPROACH CONTROL OF UNMANNED AERIAL VEHICLES

CROSS REFERENCE TO RELATED APPLICATIONS

This application claims priority to and the benefit of the German patent applications Ser. No 10 2015 011 033.0 filed Aug. 22, 2015 and Ser. No. 10 2015 013 104.4. filed Oct. 10 2015.

BACKGROUND OF THE INVENTION

The present invention relates to a method for destination approach control of unmanned aerial vehicles, in particular delivery drones. There are already many considerations to serve the so-called last mile of the delivery of retail goods by use of autonomously flying unmanned flying objects, so-called drones. In today's business and production cycle, the last mile of delivery is still a gap which has hitherto been covered insufficiently. All other stations in the supply chain of mass production, mass transport by container, distribution logistics centers and ordering via online shops by the customer are already largely rationalized.

The last mile, i.e. the physical transfer of the goods to the customer, however, is still a high cost item caused either by the retail outlets where the customer must pick up the goods themselves, or by delivery services, which bring the goods to the customer. Through the use of autonomous flying drones, there are expectations that lead to considerable savings for the supplier as well as convenience and time savings for the customer.

The type of goods to be delivered is by no means limited to traditional retail consumer products. Also courier shipments, food supplies and medical supplies, pharmacies or emergency shipments can be distributed ideally in this way. Likewise, the drone may also pick up goods at the customer.

There are multiple descriptions of delivery drones known in great detail, for example, in U.S. Pat. No. 20,150,120, 094$^{th}$. Here both the UAV itself, autonomous route guidance to the customer, as well as various options for safe delivery of the goods to the recipient are described.

Nevertheless, in particular the destination approach and the handover of the goods to the customer, in following also referred to as the recipient, is still a major problem. Suggested are parcel boxes which are served and filled by the drone or marked safe landing zones, for example in the garden to which goods may be delivered. Both require an appropriate place to land nearby the recipient and detailed location information for a precise destination approach navigation which go far beyond the currently available navigation data on street level and the accuracy of conventional GPS. Deliveries in densely built-up areas, as well as multi-family homes without suitable open spaces are impossible with those methods. In case the recipient requires the delivery of the goods if possible at a location other than his home address, automatic delivery to a parcel box in his garden is of little use anyway.

Security is a critical factor in the delivery because near the ground there can always be unforeseen obstacles like kids playing or animals that can get in the way of the trajectory of the drone. Also, liability issues are still completely unsolved.

BRIEF SUMMARY OF THE INVENTION

Object of the present invention is to describe a method for destination approach control of delivery drones to a recipient that does not have the disadvantages mentioned above.

The method allows a safe and reliable approach of the drone to any location where the recipient is located. At the site, no special devices or other supportive factors need to be present to accept the delivery.

DETAILED DESCRIPTION OF THE INVENTION

In the following description, it is assumed that a delivery is always initiated or released by the recipient and that is he is situated at the desired delivery address locally. That's usually the case for food supplies, and courier deliveries and still an advantage when receiving regular retail shopping items. So the recipient can request the delivery at a time that fits best for him, for example even outside normal business hours. Also, he can choose the delivery location at short notice. For a drone is this usually not a problem, they can deliver the goods at any time on demand by a local delivery center in a timely manner to the recipient.

Figure 1:
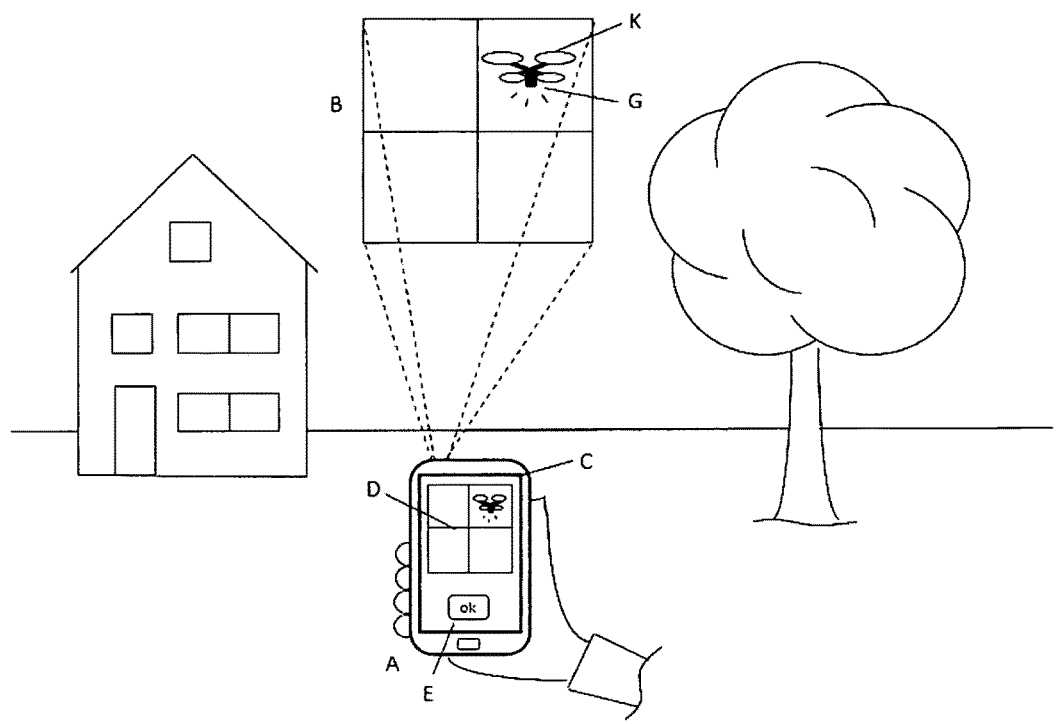
FIG. 1:
The recipient turns his mobile device skywards and selects a section of the sky which is free of obstructions.

The figures show the following:

FIG. 1:
The recipient turns his mobile device A skywards and selects a section of the sky B which is free of obstructions. This section B is displayed in the Camera Preview on the display C. Guides D as frame or a crosshair offer support. The selected position is saved by pressing button E and defines the safe approach corridor F (GPS position, compass angle I, inclination angle J). The light emitted from the light signal G of the drone K is recognized by the camera of the mobile device A.

Figure 2:
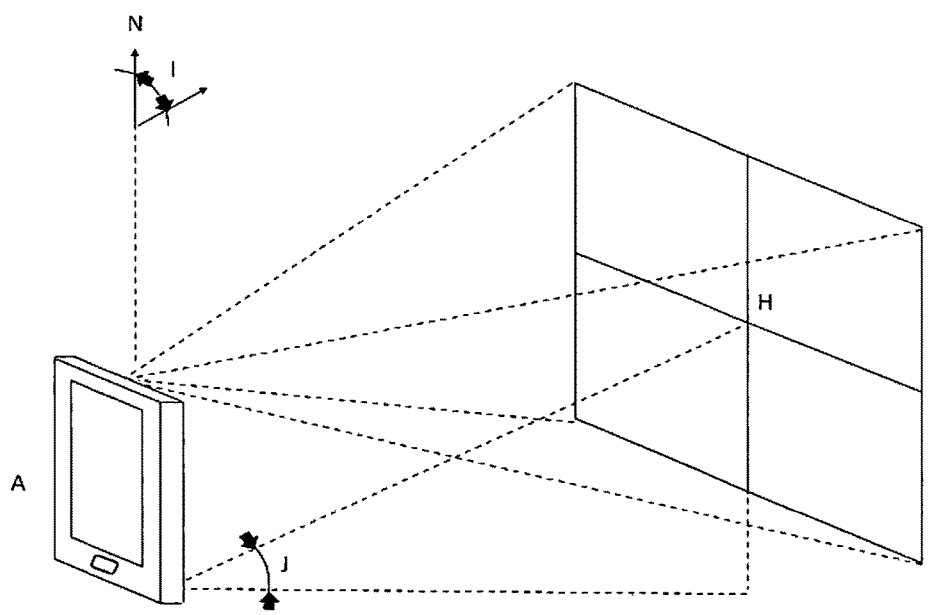
FIG. 2:
The fixed point in the sky and the approach corridor are determined from the current position of the mobile device, the compass angle, the inclination angle and the known altitude of the drone.

FIG. 2:
The fixed point H in the sky and the approach corridor F are determined from the current position of the mobile device A, the compass angle I, the inclination angle I and the known altitude of the drone K in autonomous flight mode. The opening angle of the approach corridor F results from the angle of the camera. The fixed point H is exactly centered in the approach corridor F.

Figure 3:
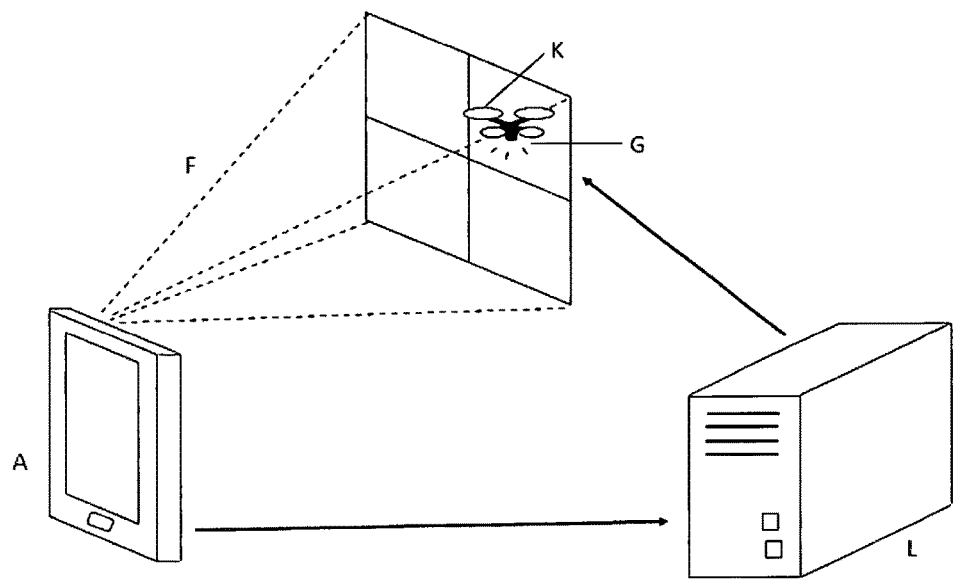
FIG. 3:
There is a closed control loop in place.

FIG. 3:
There is a closed control loop in place: The position of the drone K is captured by the camera of the mobile device A relative to the defined approach corridor F and transmitted to the central processing unit L. On the processing unit L, firstly the drone K is identified based on the encoded light signal G and secondly, the exact positioning relative to the defined safe approach corridor F is recognized. Differences are calculated and corrective control commands are sent out to the drone K. The drone K adjusts its position and continues the approach.

Disclosed is a method comprising the following components:
A delivery drone K, operated by a supplier, capable of flying autonomously from a local delivery center to a defined fixed point in the sky H in the vicinity of the recipient. The drone K is equipped with a mobile data connection to receive control commands on the go. In addition, the drone K has a light source G with which it can emit bright and coded light signals, as well as distance sensors for collision warnings at close range.

A recipient of the goods who has a mobile device A equipped with a display C, a GPS receiver, a mobile data connection, an electronic compass, an inclination angle sensor and an electronic camera. This can be a smartphone, a tablet, an augmented reality goggles or a Smart Watch. A combination of these devices is also conceivable. On the mobile device A, an application of the supplier is installed that has access to the functions listed above.

A central processing unit L, which is connected by a mobile data communication with the drone K and the mobile device A of the recipient. The processing unit L will be able to perform image analysis and send control signals to the drone K.

The delivery process preferably now runs as follows:

1. The customer/recipient purchases goods from the supplier. The order is preferably done electronically via an app or a website.
2. Shortly before the delivery of the items is scheduled or requested by the recipient, the recipient is prompted by the supplier to launch the software installed on his mobile device A, to go to a location in his vicinity from where he has a clear view to the sky and there to hold the camera preview screen of the application in such a direction B from which the drone K can approach his standing location safely. The direction B should in particular be clear of obstacles such as buildings, trees, power lines and possible intersecting vehicles etc.
3. Once the recipient has defined an appropriate approach direction B, the GPS position, the compass angle I and the inclination angle J of this position are saved and transmitted to the supplier.
4. At the central processing unit L, a fixed point in the sky H is calculated based of the data transmitted from the recipient and the flight level on which the drone K moves autonomously. From this fix point H on the drone K will start the destination approach to the recipient in the approach corridor F that was previously defined by position of the recipient, compass angle I and inclination angle J.
5. As soon as the drone K reaches the fixed point H, the recipient is asked again to go to the predetermined location and to turn his mobile device A with the camera skyward. A crosshairs grid D or other guides in the Preview of the display C of his mobile device A allow him to occupy exactly the same alignment that was previously stored and transmitted.
6. Once the drone K reaches the fixed point H it appears in the Camera Preview image which is sent as a Life-Stream to the processing unit L. The drone K begins with the emission of light signals which are also received by the camera and transferred to the processing unit L.
7. The drone K starts now the destination approach. The recipient has to keep his mobile device A spatially constant, for which purpose it is supported by an optical, acoustic or haptic alarm in case of variations in compass angle I and inclination angle J. On the Preview, crosshair lines D or a frame support the recipient.
8. The central processing unit L detects the light signal of the drone K as exactly the signal which belongs to the delivery of this recipient. It evaluates the position of the drone K relative to the defined save approach corridor F on the life stream and sends correction commands to the drone K.
9. The drone K reaches the recipient and stops either by command that the recipient has sent from his mobile device A or automatically based on a signal from the distance sensors.
10. The recipient unloads the drone K and releases it for the return flight. The drone K flies back the same corridor F as it had come until it reaches again the flying height for autonomous flying.

The described method encompasses a closed loop from the current position of the drone K relative to the predetermined safe approach corridor F. The live image of the drone K is recorded by the camera of the mobile device A and sent to the processing unit L. There, the image data is analyzed and the position of the drone K is detected with reference to the light source G relative to the approach corridor F defined by GPS, compass and inclination angle sensor. Deviations are recognized promptly and can be corrected. Thus a safe and accurate guidance of the drone K in unknown territory is possible.

In case the recipient moves the camera preview of his mobile device A away from the safe approach corridor F or the life stream is interrupted, this is recognized by the sensors and the drone K will automatically stop or abort the approach.

The closed control loop tolerates relatively imprecise data from the sensors in the mobile device A. Neither GPS nor compass nor the sensor for the inclination angle J must be particularly accurate, since first a rather wide approach corridor is spanned and the drone position is constantly readjusted during the approach. It is even possible to use cell localization if just is no GPS signal is available. The approach corridor F narrows ever further the closer the drone K comes to the recipient until it finally reaches him with great precision. Gyroscope sensors might be used when available in the mobile device A to further increase accuracy of the orientation sensors.

With the built-in light source G, the drone K can be accurately assigned to the associated recipient. For this purpose, each drone K can send a specific code of light signals to identify itself. The detection of an illuminated dot on the camera-life-stream is much easier than detecting the drone K itself. By use of a light signal, the drone K is always reliably detected, even in the dark, at rain or poor visibility conditions. The drone K will conduct its autonomous flight typically at a height of 50-200 meters. From this distance, the light signal can be clearly recognized with conventional cameras in mobile devices A. It is conceivable to use a pointed light source G which radiates only in the direction of the recipient. This saves energy and avoids interference with other people.

The light source G can automatically adjust its brightness depending on the ambient lighting conditions and the distance to the recipient to maintain optimum visibility for the camera of the mobile device A. With this automatic adjustment, is also avoided that the recipient or any other person in his vicinity be blinded or harassed while the drone K approaches the receiving location. The size of the light source G, as recognized by the camera of the mobile device A, may be used to calculate the distance between the drone K and the mobile device A allowing to smoothly adjust the approach speed of the drone K.

Built-in distance sensors in the drone K similar to parking sensors used in cars provide additional safety. The drone K should stop in case something unforeseen intersects its trajectory or if the drone K is intentionally directed against an obstacle or it has reached its destination point.

The rotors of the drone K should be provided with a protection cover, so that there is no danger in case of an accidental collision with an obstacle or when getting in contact with the recipient.

As a further safety feature, the life image of the approach of the drone K can be recorded by the central processing unit L. Intentionally induced collisions by the recipient can be easily subsequently proved and any unforeseen incidents explained. The drone K itself does not require having a camera, and thereby generates no conflict with the violation of the privacy of individuals in the area overflown. In case the recipient turns away the camera of his mobile device A so that the drone K is no longer visible, the life stream may be interrupted to avoid transmitting sensitive images not related to the drone K approach.

Similarly, the approach corridor F can be identified as save by either a computer program or an employee of the supplier based on the transmitted image data and the approach can only then be granted.

The recipient may have the opportunity to pause the approach from his mobile device A or cancel in case a safe approach is no longer given. If the connection is lost, the drone K independently stops and flies back on the path to the fixed point H.

The method is much more secure than fully automatic deliveries, since the recipient can intervene if necessary and can pause or cancel the approach. On the other hand, misuse is effectively prevented by the built-in security mechanisms. The recipient himself never gets in control of the drone K, the control is always carried out by the central processing L unit or by the drone K itself. The recipient simply defines the safe approach corridor F, for which he can also be held liable. Simultaneously, the recipient also responsible for the existence of the necessary overflight rights in the approach corridor F.

A special advantage is that no infrastructure on the side of the recipient is necessary. There are no specific receiving stations needed or designated and marked landing zones. The exact geographical and topographical information about the destination area must not be known. It is even conceivable to make deliveries to places where landing is not possible at all, for example, on balconies or windows of multi-story buildings. As drone K does not have to touch the ground to hand over the deliverables, it is preferable for the customer to have the drone K designed in a way that allows convenient access to the deliverables without having to lean forward too much or getting close to the rotors of the drone K.

Further, it would even be conceivable to perform the described method supplies to and from moving destinations, such as a moving motor vehicle.

Since mobile devices A with the characteristics described above are widely spread nowadays, the delivery procedure described in this application can be used immediately by everyone. The entire process of the destination approach as typically takes less than a minute, so that here no great effort is needed by the recipient. Overall, the delivery directly into the hands of the recipient is much more secure, flexible and above all more comfortable than the delivery to a parcel box or another defined receiving place.

The invention claimed is:

1. A method for destination approach control of an unmanned aerial vehicles, preferably a drones with the ability to transport and deliver goods, equipped with a mobile data connection in order to receive control commands, to a recipient who has a mobile device with a mobile data connection, a display and at least one rear camera, comprising the following steps:

Emitting of light signals, from a light source on the drone, at least during the destination approach;

Receiving of the emitted light signals, by the recipient, with the camera of the mobile device, during the destination approach of the drone, thereby detecting a position of the drone;

Comparing the detected position of the drone with a previously determined safe approach corridor and from deviations, calculating control commands for correcting the position of the drone;

Sending of the control commands to the drone, resulting in a closed control loop during the destination approach of the drone.

2. The method according to claim 1, whereas the mobile device is equipped with sensors for determining a geographic position, a compass angle and an inclination angle and the method further comprising determining the safe approach corridor before the drone starting the destination approach, by the recipient, by selecting with a camera preview image on the display of the mobile device an area skywards from the recipient's current location that is free of obstacles; and saving data of the geographic position, the compass angle and the inclination angle for said selection.

3. The method of claim 2, further comprising the mobile device giving optical, acoustic or haptic notes to the recipient when the recipient turns the camera of the mobile device away from the defined safe approach corridor during the destination approach of the drone.

4. The method of claim 2, further comprising sending of the received light signals from the camera of the mobile device and the saved data of the safe approach corridor as a life stream to a central processing unit; and storing of said data there.

5. The method of claim 1, further comprising the drone pausing or cancelling the destination approach in case the mobile data connection has been lost or no control commands are received.

6. The method claim 1, further comprising the recipient pausing or cancelling the destination approach of the drone from his mobile device at any time.

7. The method of claim 1, whereas the light signals of the drone are coded and the code sequence can be used to uniquely identify the drone.

8. The method of claim 1, whereas the light signals are emitted as a focused beam of light that is emitted only in a direction of the recipient and brightness of said light signals automatically adjusts depending on the ambient brightness and distance to the recipient.

9. The method of claim 1, further comprising the drone flying autonomously to a fixed point in the sky, which is determined from an intersection of the safe approach corridor and an altitude for autonomous flying, from where the destination approach starts.

10. The method of claim 9, further comprising the drone flying back from the recipient to the fixed point in the sky independently.

* * * * *